US008327437B2

(12) United States Patent
McAlister (10) Patent No.: US 8,327,437 B2
(45) Date of Patent: *Dec. 4, 2012

(54) SECURING NETWORK TRAFFIC BY DISTRIBUTING POLICIES IN A HIERARCHY OVER SECURE TUNNELS (75) Inventor: Donald K. McAlister, Apex, NC (US)

(73) Assignee: Certes Networks, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/853,936

(22) Filed: Aug. 10, 2010

(65) Prior Publication Data
US 2011/0013776 A1 Jan. 20, 2011

Related U.S. Application Data (63) Continuation of application No. 11/807,187, filed on May 25, 2007, now Pat. No. 7,774,837.

(60) Provisional application No. 60/813,766, filed on Jun. 14, 2006.

(51) Int. Cl.
G06F 15/16 (2006.01)

(52) U.S. Cl. .................. 726/15; 726/1; 726/14

(58) Field of Classification Search ........... None
See application file for complete search history.

(56) References Cited

U.S. PATENT DOCUMENTS

| 4,200,770 A | 4/1980 | Hellman et al. |
|---|---|---|
| 5,237,611 A | 8/1993 | Rasmussen et al. |
| 5,577,209 A | 11/1996 | Boyle et al. |
| 5,940,591 A | 8/1999 | Boyle et al. |
| 6,035,405 A | 3/2000 | Gage et al. |
| 6,061,600 A | 5/2000 | Ying |
| 6,173,399 B1 | 1/2001 | Gilbrech |
| 6,275,859 B1 | 8/2001 | Wesley et al. |
| 6,330,562 B1 | 12/2001 | Boden et al. |
| 6,484,257 B1 | 11/2002 | Ellis |
| 6,556,547 B1 | 4/2003 | Srikanth et al. |
| 6,591,150 B1 | 7/2003 | Shirota |
| 6,658,114 B1 | 12/2003 | Farn et al. |
| 6,697,857 B1 | 2/2004 | Dixon et al. |
| 6,711,679 B1 | 3/2004 | Guski et al. |
| 6,823,462 B1 | 11/2004 | Cheng et al. |
| 6,915,437 B2 | 7/2005 | Swander et al. |
| 6,920,559 B1 | 7/2005 | Nessett et al. |
| 6,981,139 B2 | 12/2005 | Enokida |

(Continued)

FOREIGN PATENT DOCUMENTS

WO WO 2007/146045 A2 12/2007

OTHER PUBLICATIONS

Frankel, S. "Demystifying the IPsec Puzzle," *Artech House*, Ch. 5, pp. 87-127 (2001).

(Continued)

*Primary Examiner* — David Pearson
(74) *Attorney, Agent, or Firm* — Hamiltton, Brook, Smith & Reynolds, P.C.

(57) ABSTRACT

A technique for securing message traffic in a data network using a protocol such as IPsec, and more particularly various methods for distributing security policies among peer entities in a network while minimizing the passing and storage of detailed policy or key information except at the lowest levels of a hierarchy.

20 Claims, 5 Drawing Sheets

U.S. PATENT DOCUMENTS

| | | |
|---|---|---|
| 6,986,061 B1 | 1/2006 | Kunzinger |
| 7,103,784 B1 | 9/2006 | Brown et al. |
| 7,739,728 B1 * | 6/2010 | Koehler et al. ............ 726/11 |
| 7,774,837 B2 * | 8/2010 | McAlister ............ 726/15 |
| 2002/0154782 A1 | 10/2002 | Chow et al. |
| 2002/0162026 A1 | 10/2002 | Neuman et al. |
| 2003/0135753 A1 | 7/2003 | Batra |
| 2003/0177396 A1 * | 9/2003 | Bartlett et al. ............ 713/201 |
| 2003/0191937 A1 | 10/2003 | Balissat et al. |
| 2004/0005061 A1 | 1/2004 | Buer et al. |
| 2004/0044891 A1 | 3/2004 | Hanzlik et al. |
| 2004/0062399 A1 | 4/2004 | Takase |
| 2004/0083386 A1 | 4/2004 | Marquet et al. |
| 2004/0093524 A1 | 5/2004 | Sakai |
| 2004/0160903 A1 | 8/2004 | Gai et al. |
| 2004/0268124 A1 | 12/2004 | Narayanan |
| 2005/0010765 A1 | 1/2005 | Swander et al. |
| 2005/0066159 A1 | 3/2005 | Poussa et al. |
| 2005/0125684 A1 | 6/2005 | Schmidt |
| 2005/0138369 A1 | 6/2005 | Lebovitz et al. |
| 2005/0149732 A1 | 7/2005 | Freeman et al. |
| 2005/0190758 A1 | 9/2005 | Gai et al. |
| 2006/0072748 A1 | 4/2006 | Buer |
| 2006/0072762 A1 | 4/2006 | Buer |

OTHER PUBLICATIONS

Frankel, S. "Demystifying the IPsec Puzzle," *Artech House*, Ch. 9, pp. 179-205 (2001).

Menezes, A. J., et al., "Handbook of Applied Cryptography," (CRC Press LLC), pp. 570-572 (1997).

International Search Report in International Application No. PCT/US2007/013390, 2 pages, mailed Apr. 11, 2008.

International Preliminary Report on Patentability in International Application No. PCT/US2007/013390, 8 pages, date of issuance of report: Dec. 18, 2008.

* cited by examiner

SECURING NETWORK TRAFFIC BY DISTRIBUTING POLICIES IN A HIERARCHY OVER SECURE TUNNELS

RELATED APPLICATIONS

This application is a continuation of U.S. application Ser. No. 11/807,187, filed May 25, 2007, now U.S. Pat. No. 7,774,837, which claims the benefit of U.S. Provisional Application No. 60/813,766, filed Jun. 14, 2006. The entire teachings of the above applications are incorporated herein by reference.

FIELD OF THE INVENTION

The present invention relates to securing message traffic in a data network using a protocol such as IPsec, and relates more particularly to how security policies are distributed in the network.

BACKGROUND OF THE INVENTION

The following definitions are used in this document:

"Securing" implies both encryption of data in transit as well as authenticating that the data has not been manipulated in transit.

A "secure tunnel" between two devices ensures that data passing between the devices is secure.

The "security polices" or "policies" for a secure tunnel define the traffic to be secured by source and destination IP address, port, and/or protocol. They also define the type of security to be performed.

A "key" for a secure tunnel is the secret information used to encrypt and decrypt (or authenticate and verify) the data in one direction of traffic in the secure tunnel.

A "Policy Enforcement Point" (PEP) is a device that secures the data based on the policy.

Existing Network Security Technology

According to the most commonly used computer networking protocols, network traffic is normally sent unsecured without encryption or strong authentication of the sender and receiver. This allows the traffic to be intercepted, inspected, modified, or redirected. As a result, either the sender or receiver can falsify their identity. In order to allow private traffic to be sent in a secure manner, a number of security schemes have been proposed and are in use. Some are application dependent, as with a specific program performing password authentication. Others, such as Transport Layer Security (TLS), are designed to provide comprehensive transport layer security such as the HTTP (web) and FTP (File Transfer Protocol) level.

Internet Security (IPsec) was developed to address a broader security need. As the majority of network traffic today is over Internet Protocol (IP), IPsec was designed to provide encryption and authentication services to this traffic regardless of the application or transport layer protocol. This is done, in IPsec tunnel mode, by encrypting a data packet (if encryption is required), performing a secure hash (authentication) on the packet, then wrapping the resulting packet in a new IP packet indicating it has been secured using IPsec.

The secret keys and other configuration data required for this secure tunnel must be exchanged by the parties involved to allow IPsec to work. This is typically done using Internet Key Exchange, IKE. IKE key exchange is done in two phases.

In a first phase (IKE Phase 1), a connection between two parties is started in the clear. Using public key cryptographic mechanisms, where two parties can agree on a secret key by exchanging public data without a third party being able to determine the key, each party can determine a secret for use in the negotiation. Public key cryptography requires each party either share secret information (pre-shared key) or exchange public keys for which they retain a private, matching, key. This is normally done with certificates (Public Key Infrastructure or PKI). Either of these methods authenticates the identity of the peer to some degree.

Once a secret has been agreed upon in IKE Phase 1, a second phase (IKE Phase 2) can begin where the specific secret and cryptographic parameters of a specific tunnel are developed. All traffic in phase 2 negotiations are encrypted by the secret from phase 1. When these negotiations are complete, a set of secrets and parameters for security have been agreed upon by the two parties and IPsec secured traffic can commence.

When a packet is detected at a Security Gateway (SGW) with a source/destination pair that requires IPsec protection, the secret and other security association (SA) information are determined based on the Security Policy Database (SPD) and IPsec encryption and authentication is performed. The packet is then directed to an SGW that can perform decryption. At the receiving SGW, the IPsec packet is detected, and its security parameters are determined by a Security Packet Index (SPI) in the outer header. This is associated with the SA, and the secrets are found for decryption and authentication. If the resulting packet matches the policy, it is forwarded to the original recipient.

General Limitations of IPsec

Although IPsec tunnel mode has been used effectively in securing direct data links and small collections of gateways into networks, a number of practical limitations have acted as a barrier to more complete acceptance of IPsec as a primary security solution throughout industry.

Configuration of Policies—Each SGW must be configured with each pair of source and destination IP addresses or subnets that must be secured (or allowed in the clear or dropped). If there are 11 SGW units fully meshed, each protecting 10 subnets, this requires 1000 policies in the SPD. This is a challenge in terms of the user setting up the policies, the time required to load the policies, the memory and speed difficulties in implementing the policies, and the increase in network time spent performing negotiations and rekey. The time for initial IKE negotiations in this example might be 10 minutes or more.

In addition, even for smaller networks, it requires the user to have a complete knowledge of all protected subnets and their security requirements. Any additions or modifications must be implemented at each gateway.

Certificate/PKI Management—PKI can become complex and difficult to manage. At minimum, it is intimidating to many network managers. However, strong PKI implementation is at the heart of effective security using IPsec (or TLS for that matter). The SGW should make this aspect as easy as possible for the network manager.

Multicast/Broadcast Traffic—IPsec in its present configuration cannot secure multicast or broadcast traffic. This is because keys are established between two entities and multicast or broadcast involves sending traffic from one source to many destinations at once.

The Internet Engineering Task Force (IETF) has a couple of Requests for Comments (RFCs) in place or in process to address group domain of interpretation (GDOI), or group secure association key management protocol (GSAKMP). GDOI is generally available, for example, on Cisco devices.

Load Balancing—Many large network implementations require load balancing or other Quality of Service (QOS) techniques where traffic to a particular address may take one of a number of paths. If a set of SGW units must be placed along these parallel paths, there might be no way to assure which SGW traffic sees. As IKE provides secrets only between a pair of SGW units (remote and local), traffic to the second SGW would require a different set of secrets. In the existing IPsec implementations, this is impossible. The result is a limitation in the placement of SGW units in the network which may not be possible in certain situations.

Network Address Translation (NAT)—There are various forms of NAT, all of which cause problems for IPsec.

With Static NAT, a source IP address on an outgoing packet is replaced with an assigned replacement IP address. If the SGW exists before the static NAT device, the original source IP address will still exist in the encrypted packet and will be exposed on decryption. This would likely create problems on the receiving network or on the return packet. Dynamic NAT (which is rarely used) is similar except that the replacement IP address comes from an available pool. In either case, the SGW must be placed outside the NAT device.

In masquerading dynamic NAT (NAPT), the source IP address of a packet is replaced with a new source IP address and the port number is changed to identify the original source IP address and port. This might be done to provide a single IP address to the wide area network (WAN) for a large number of IP addresses in the local area network (LAN).

Unfortunately, if the SGW is behind the NAT device, IPsec hides the port and IP address on the original packet and does not provide a port on the outer header. The NAPT protocol is broken without a port to modify. A mechanism called NAT-Traversal (NAT-T) had been added to IPsec to address this problem. This can also be addressed by placing the SGW outside the NAT devices. Normally this cannot be done in cases of remote access by a home user running the IPsec gateway on their computer.

Further variations of NAT can be combined with load balancing, creating virtual servers, or providing QOS which combines the problems of NAT with the load balancing problem described above.

Firewalls/Intrusion Detection Systems (IDS)—A firewall or IDS can create conflict with IPsec as they may require inspection of the packet beyond the outer header (Layer 3). Firewall rules are often set to manage connections based on port or protocol, but this information is stored in the encrypted packet under IPsec. An IDS normally does deep packet inspection for viruses, worms, and other intrusion threats. Again, this information is encrypted under IPsec. Many firewall functions can be implemented using well written IPsec policies, although this can complicate the SPD entries. If the SGW is on the WAN side of the firewall and IDS, this problem is eliminated.

Path Maximum Transfer Unit (PMTU) and Fragmentation— The PMTU specifies the maximum IP packet size that can be sent. Above that size, packets must be fragmented to be sent in smaller sizes. A protocol for PMTU discovery permits a device to send larger and larger packets with a Do Not Fragment bit set. This continues until a device with a path limitation sends back a message that the packet is too large. Other networks simply set the PMTU to a specific value.

In IPsec, however, the packet is made larger by the IPsec header information. If the devices behind the SGW uses the largest packet size, the SGW must either fragment the packet, which can be slow and certainly reduces network efficiency, or ignore the PMTU. To avoid this problem, networks must employ PMTU discovery or set the PMTU for devices behind the SGW smaller than for the main network.

Resilient Network Traffic—If the network is implementing resiliency, it will likely require the secure solution be resilient as well. This can be accomplished with a virtual router redundancy protocol (VRRP), but a switchover would result in the need to rekey all traffic. In a fully meshed situation, this could be a significant interruption. If fast switchover is required, a resilient gateway with shared state may be needed.

In addition, one of the most significant barriers to general acceptance of IPsec as a security solution is the challenge of securing the data as it leaves on computer to where it enters the remote computer. This level of security, combined with authentication and authorization on each side, would extend security from just covering the WAN (e.g., the internet) to protecting data from unauthorized internal access. Some of the general limitations of IPsec are exacerbated by end-to-end deployment. For example, the IPsec implementation cannot be place on the WAN side of the firewall, IDS, NAT device, or any load balancing between virtual servers. There are a number of hurdles to true end-to-end security in addition to the general limitations described above:

Installation of an IPsec/IKE Stack on Individual PCs—With the variety of available operating systems (Windows XP, XP Service Pack 1 and 2, Linux and all it's kernel releases, etc.) and hardware platforms, a software implementation of the IPsec stack, which is dependent on both of these, must be designed, compiled, tested, and supported for each implementation.

Hardware solutions, such as IPsec on a NIC, provide some separation from these issues, but preclude automated remote installation of the IPsec stack.

In addition, the computer with the installation must be configured with the user certificate and the policy configuration. Ideally, the user would be identified in some way other than a machine based certificate. Unfortunately, all existing implementations require the computer to be configured directly, normally by a network security manager. IKE offers methods for remote access using certificate based authentication combined with RADIUS and XAUTH for the user ID as well as mode configuration to supply the user with a local network identification.

Limitation in Ability to Provide High-Speed, Low Latency, and High Number of SAs and Policies—A software solution on a computer (or mobile device) would be unable to provide high speed encryption or latency as low as on the existing SGW. In some cases this doesn't matter, but in situations with a high speed connection or involving streaming data, this may be significant. A hardware solution may suffer this limitation as well due to heat, space, or power considerations.

Either solution may be limited in the number of SAs or policies that are supported. This could be critical in a large, meshed security situation.

SUMMARY OF THE INVENTION

A. Division of Security Policy Definition, Key Definition, and Their Distribution Implementation of a SGW requires policy management, IKE key generation and exchange, and IPsec policy enforcement. By dividing these functions into separate components and combining them in new ways, one can solve some of the limitations of existing IPsec approaches and offer approaches to resolving some others. One approach used by the present invention herein is the logical separation of IKE and IPsec functionality, with distribution of policies over secure tunnels. The functions provided are by modules of the system of the present invention as the following: Policy Enforcement Point (PEP), Key Generation Layer, Local and Remote Policy Definitions, Policy Linkage, Policy Distribution, and other relevant modules. Detailed description of the functions of these modules are to follow.

It should be noted that, in general, all traffic between the modules described above should either be local (within a single device) or protected by a secure tunnel. Management of each device should also be done via a secure tunnel and with secure user authentication. Also, if a highly resilient implementation is required, each module must be resilient and, if state is stored, a method for exchanging state and performing switch over implemented.

B. Problem Solution Using Distributed Policy and Key Generation, Shared Keying, and Secure Policy Dissemination The present invention is a method for securing message traffic in a data network by distributing security policies. A security policy is identified to a first key generation and distribution point (KGDP) located at a first location. The security policy is a policy to be applied to a network connection, and include at least an identification of a first security group and a network device that is assigned to the first security group at the first location.

The communication network includes, in different embodiments, an Ethernet, an asynchronous transfer mode (ATM), one or more inter-networking devices (i.e. a router or a switch), or a wireless communication network.

The security policy is forwarded from the first KGDP to a first security policy manager (SPM) device. The first SPM is also located at the first location. The first SPM device stores an association between the first security policy and an identifier for the KGDP at the first location.

The first SPM then sends a message to a central security policy manager (cSPM) indicating that the first SPM has information pertaining to a security group that pertains to the first KGDP.

The cSPM, then stores a representation of the first SPM that sent the message and the first security group, optionally including an identifier for the first KGDP.

Upon receiving similar messages from other SPMs, the cSPM can then make and report associations between devices and security groups. This is done without the cSPM actually having to know network device configurations or keys.

The present invention relates to novel ways to secure IP traffic using IPsec where the security policies, which define traffic to be secured and the security parameters for that traffic, and the keys, the secret information used to encrypt and authenticate traffic, are generated in a distributed manner. This distribution can be done in either by central control or in a hierarchical manner. In addition, the keys are shared over a number of devices, and dissemination of the security policies and keys is sent and received via secure tunnels. Finally, because of the shared keying and distributed security policies, the non-secure part of the packet, the outer header, can use the original IP source and destination address.

One embodiment of the present invention is a system for securing Internet Protocol (IP) traffic. The system includes a first location. The first location includes a communication network with which the components of the system interface. The components include a first group of end nodes, of which at least some end nodes of the first group are defined as a security group. Furthermore, the components include a first that is configured to apply a security policy to a network connection, and a first distribution point that is configured to store the security policy and to forward the security policy to a first managing module. The first managing module is configured to receive the security policy from the distribution point and to record an association between the security policy and an identifier for the first distribution point, and to perform a policy linkage when the definition of the security group is updated. The security policy includes at least the definition of the security group.

In a first preferred embodiment, the communication network includes, in different embodiments, an Ethernet, an asynchronous transfer mode (ATM), one or more inter-networking devices (i.e. a router or a switch), or a wireless communication network.

In a second preferred embodiment, the first managing module is further configured to send first information to a central managing module, which is configured to generate a security group database entry based on the first information. Furthermore, the first information indicates that the first managing module has stored the definition of the security group associated with the first distribution point. In a more preferred embodiment to the second preferred embodiment, the first managing module and the central managing module are in a hierarchy. The hierarchy comprises at least a second managing module, which is located in a second location and configured to send a message to the central managing module that indicates the second managing module has additional information associated with the definition of the security group.

Another embodiment of the present invention is a method for securing message traffic in a data network by distributing security policies. The method comprises the steps at a first distributing point of a first location of determining a security policy to be applied to a network connection, and forwarding the security policy from the first distribution point to a first controlling module. The security policy includes the steps at a first managing module including at least a definition of a security group and a network device that is assigned to the security group. The method further comprises the steps at a first managing module of receiving the security policy from the first distribution point, recording a first association between the first security policy and an identifier for the first distribution point, and sending a message to a central managing module indicating that the first managing module has stored the definition of the security group associated with the first distribution point. The method yet further comprises the steps at the central managing module of receiving the first message and generating a security group database entry based on the first message. In a preferred embodiment, the method further includes the step at the central managing module of receiving additional messages associated with definitions of additional security groups from two or more additional managing modules, and generating additional security group databases entry based on the additional information. In a more preferred embodiment, the method further includes the step at a second managing module in a second location of recording a second association between the security policy and an identifier for a second distribution point. The second location includes a second distribution point.

One embodiment is a computer readable medium having computer readable program codes embodied therein for securing message traffic in a data network by distributing security policies. The computer readable medium program codes performing functions comprises a routine for determining a security policy to be applied to a network connection at a first distributing point located at a first location, a routine for forwarding the security policy from the first distribution point to a first controlling module, a routine for receiving at a first managing module the security policy from the first distribution point, a routine for recording at the first managing module a first association between the first security policy and an identifier for the first distribution point, a routine for sending a message from the first managing module to a central managing module indicating that the first managing module has stored the definition of the security group associated with the first distribution point, a routine for receiving the first message at the central managing module; and a routine for generating a security group database entry based on the first message at the central managing module. The security policy includes at least a definition of a security group and a network device that is assigned to the security group.

While a considerable amount of work has been done in the area of data security in general, particularly in IP security, the disclosed methods and apparatus are unique and useful to solve specific network needs that are lacking in the limitations and problems described above.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
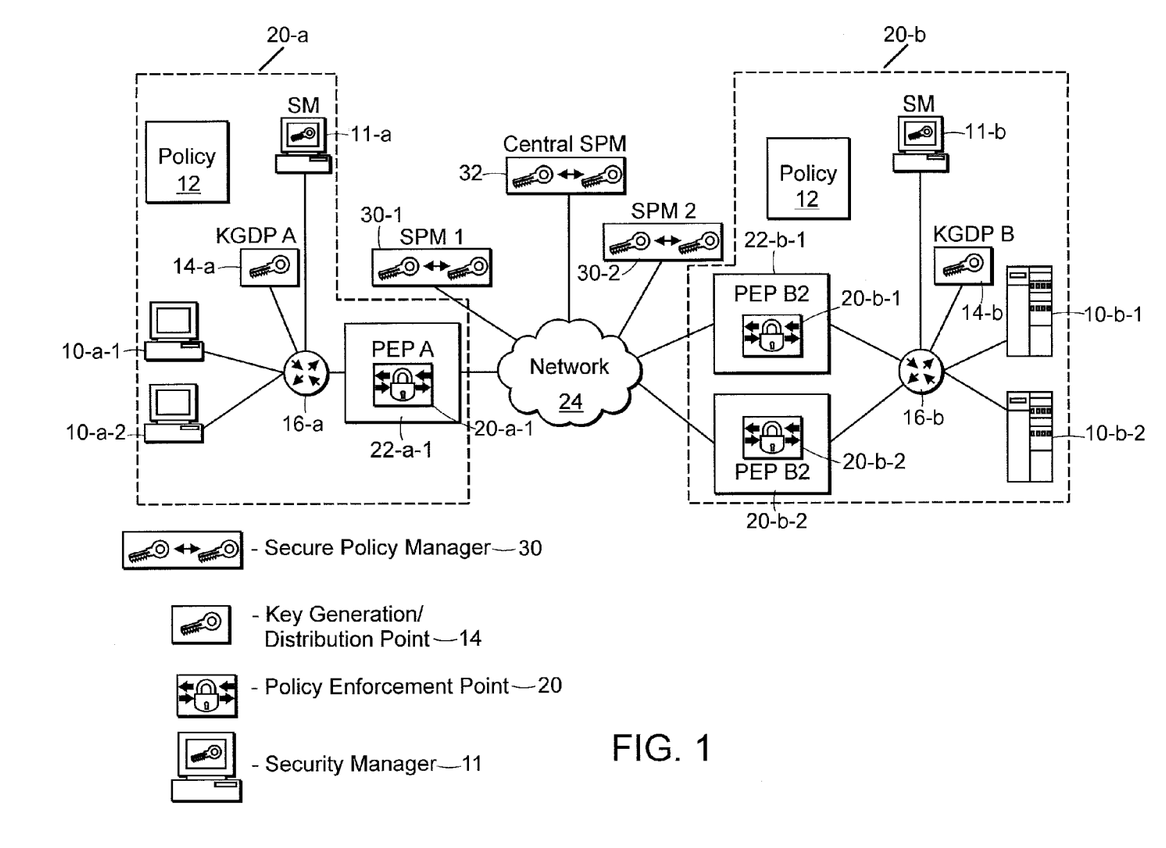
FIG. 1 is a system level diagram illustrating of a distributed policy scenario using Key Generation and Distribution Points (KGDP's), Policy Enforcement Points (PEPs), Security Managers (SM), and Security Policy Managers (SPMs), and Central SPMs (cSPMs).

A description of a preferred embodiment of the invention follows. An environment as shown in FIG. 1 in which the invention may be implemented generally has a number of data processors and functions including end nodes 10, a managing module (i.e. Security Manager (SM) 11), a distribution point (i.e. a Key Generation and Distribution Point (KGDP) 14), and a security module (i.e. Secure Gateways (SGWs) 22), connected by interfacing a communication network such as at least two inter-networking devices 16 (i.e. such as routers/switches). One or more of the SGWs 22 has an associated Policy Enforcement Point (PEP) function 20. PEP is a software module that executes in a SGW on the data path that performs packet encryption and decryption as well as IPsec header generation on packets requiring security. It also passes or drops packets, and may be configured to perform additional functionality such as Static NAT or fragmentation. It is typically configured with security policies and SAs with security parameter indices (SPIs), and keys for encrypting and decrypting inbound and outbound packets.

The end nodes 10 can be typical client computers such as personal computers (PCs), workstations, Personal Digital Assistants (PDAs), digital mobile telephones, wireless network enabled devices and the like. The nodes 10 can also be file servers, video set top boxes, other data processing machines, or indeed any other networkable device from which messages originate and to which message are sent. The message traffic typically takes the form of data packets in the well known Internet Protocol (IP) packet format. As is well known in the art, an IP packet may typically be encapsulated by other networking protocols such as Transmission Control Protocol (TCP), User Datagram Protocol (UDP), or other lower level and higher level networking protocols.

The security manager (SM) 11 is a data processing device, typically a PC or workstation, through which an administrative user can input and configure security policies 12. The SM 11 also acts as a secure server to store and provide access to such policies 12 by other elements of the system. As will be explained more fully below, the Key Generation and Distribution Points (KGDP) 14 and Policy Enforcement Points (PEPs) 20 cooperate to secure message traffic between the end nodes 10 according to policies 12.

More particularly, a KGDP 14 is responsible for generating and distributing "secret data" known as encryption keys upon request. The keys are then used as a basis to derive other keys that actually secure transmission of traffic from one end node 10-A-1 to another end node 10-B-1, to perform authentication, and other functions.

The PEPs 20 are located on the data path, and can typically be instantiated as a process running on a Secure Gateway (SGW) 22. The PEPs 20 have a packet traffic or "fast path" interface on which they receive and transmit the packet traffic they are responsible for handling. They also have a management interface over which they receive configuration information, and other information such as policies 12 and encryption keys.

In general, traffic between the modules described above is either local (within a single device) or protected by a secure tunnel in network 24. Management of each device is also via a secure tunnel and with a secure user authentication. Also, and for highly resilient implementation is required, each module must itself be resilient and if a state is stored, a method for exchanging state and performing switch over must be implemented.

The PEPs 20 are responsible for a number of tasks. They are principally responsible for performing encryption of outbound packets and decryption of inbound packets received on the fast path interface. The PEPs 20 can thus identify packets that need to be secured according to configured policies 12. The PEPs 20 can also typically be programmed to pass through or drop such packets according to such policies 12.

The PEPs 20 are also configured to perform IPsec tasks such as handling Security Association (SA) information as instructed by the SM 11, to store and process Security Packet Index (SPI) data associated with the IPsec packets, and the like. The PEPs 20 thus perform many (if not all) of the IPsec security gateway functions as specified in IPsec standards such as Internet Request for Comments (RFCs) 2401-2412.

The SGW 22 in which the PEPs 20 run can be configured to perform additional functions typically of IP network gateways such as Network Address Translation (NAT), packet fragmentation handling, and the like. It should be understood that the PEPs 20 may also be installed on other internetworking devices, and that the choice of an SGW 22 in the illustrated embodiment is but one example.

Figure 2:
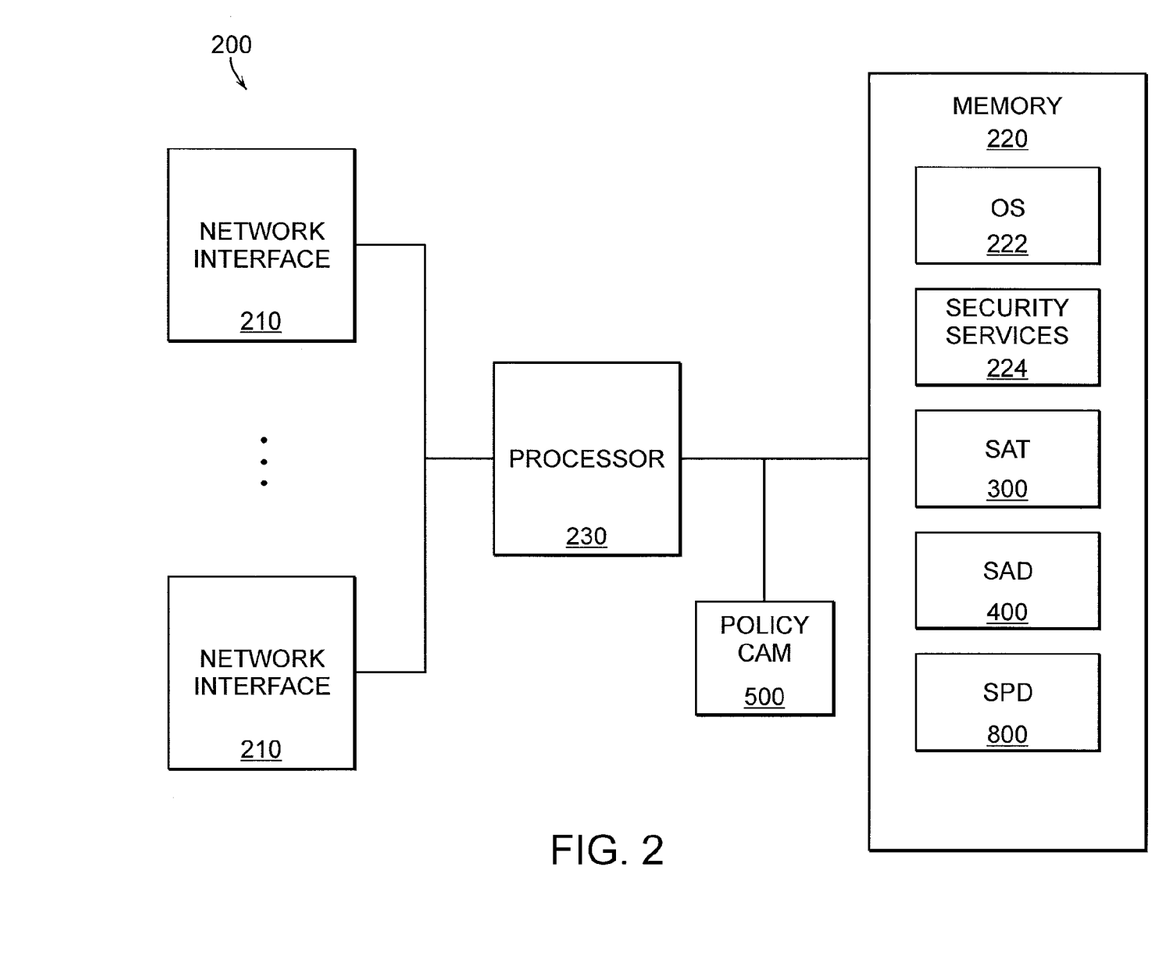
FIG. 2 is a block diagram of a SGW that may be used with the present invention.

FIG. 2 is a high-level block diagram of an SGW 200 that may be used with the present invention. SGW 200 comprises one or more network interfaces 210, a processor 230, a policy content-addressable memory (CAM) 500 and a memory 220. The network interfaces 210 are conventional network interfaces configured to interface the SGW 200 with the network 100 and enable data (packets) to be transferred between the SGW 200 and the network 100. To that end, the network interfaces 210 comprise conventional circuitry that incorporates signal, electrical, and mechanical characteristics and interchange circuits, needed to interface with the physical media of the network 100 and the protocols running over that media.

The processor 230 is a conventional processor which is configured to execute computer-executable instructions and manipulate data in the memory 220 and the policy CAM 500. The processor 230 may be a network processing unit (NPU) or may comprise a collection of interconnected processors configured as a mesh or series of processors. The policy CAM 500 is a conventional CAM device that is configurable by processor 230 and, as will be described further below, contains information that the processor uses to process packets received by the SGW 200 in accordance with aspects of the present invention.

The memory 220 is a conventional random access memory (RAM) comprising, e.g., dynamic RAM (DRAM) devices. The memory 220 includes an operating system (OS) 222, security services 224, a security association table (SAT) 300, a security association database (SAD) 400 and a security policy database (SPD) 600. The operating system 222 is a conventional operating system that comprises computer-executable instructions and data configured to implement various conventional operating system functions that support the execution of processes, such as security services 224, on processor 230. These functions may include functions that, e.g., enable the processes to be scheduled for execution on the processor 230 as well as provide controlled access to various services, such as memory 220. The security services 224 is illustratively a process comprising computer-executable instructions configured to enable processor 230 to implement various functions associated with PEP's as well as perform functions that enable the processing of packets in accordance with aspects of the present invention.

The SAT 300 is a data structure that contains information that may be used to locate security associations associated with packets processed by the SGW 200. A security association, as used herein, relates to security information that describes a particular kind of secure connection between one device and another. This security information may include information that specifies particular security mechanisms that are used for secure communications between the two devices, such as encryption algorithms, type of authentication and the like. The operation of SGW is illusrate in a copending patent application entitled SECURING NETWORK TRAFFIC BY DISTRIBUTING POLICIES IN A HEIRARCHY OVER SECURE TUNNELS, U.S. Provisional Patent Application No. 60/813,766, filed Jun. 14, 2006, assigned to CipherOptics, Inc., and which is hereby incorporated by reference.

Returning to FIG. 1, the SM 11, the PEP 20 and KDP 14 perform and/or participate in several security related functions including:
 key generation
 key distribution
 policy generation
 local and remote policy definition
 policy distribution (local and remote)
 policy linkage These functions are now discussed briefly, before continuing with detailed examples of how policy distribution is implemented according to the present invention.

Key Generation. This module creates keys to secure a given tunnel. As in IKE this is done in coordination with a single peer as each side agrees on outbound and inbound keys. However, in the embodiment of the present invention, this might also be a single unit that generates keys for traffic between a number of units. It may also be embodied in a single PEP generating a key for outbound traffic on a given tunnel.

Key Distribution. This module ensures that all connections to the tunnel have keys necessary to decrypt and encrypt data between the end points. As mentioned previously, this is done in standard IKE as part of the "Phase 2" key exchange between two peers. However, in the present invention, as will be described in several detailed examples shortly, this is performed by the PEPs exchanging keys in other ways. With these techniques, key distribution is still securely protected to prevent eavesdropping, tampering, and to ensure that the exchange occurs with an authorized party.

The Key Generation and/or Key Distribution modules may be located on individual stand alone machines, or may be incorporated together within a Key Generation and Distribution Point (KGDP). In addition, Key Distribution may be co-located with the PEP 20 in other architectures.

Local Policy Definition (also called "Policy Generation" herein). This module maintains information on IP addresses, subnets, ports or protocols protected by the PEP. This may be part of a complete security policy definition 12 for many different nodes 10 in the network as specified by the SM 11. The policy definition can also be limited to a collection of subnets protected by a certain PEP. Or it can simply relate to and be stored at a single IP address, such within the network software on a remote access client 10 (for example, Microsoft Windows and other operating systems provide certain tools for specifying security policies). The policy definition can also occur via a discovery process performed by a PEP. If a complete security policy definition is not present, it should also include information to link the protected local traffic to its secure destinations.

Local Policy Definition—This module maintains information on IP addresses, subnets, ports or protocols protected by the SGW. This might be part of a complete policy definition, as provided to the system. It might be a single IP address on a remote access client. It could be a discovery process done by a SGW. It might be a collection of subnets protected by the SGW. If the complete policy definition is not present, it must also include information to link the protected local traffic to its secure destinations.

Remote Policy Definition—This module maintains information on IP addresses, subnets, ports or protocols that are remote to the protected region which require protection of traffic with the local region. Definitions are as with the local policy definition. This function may be locally defined or distributed throughout the network.

Policy Distribution

The present invention relates more particularly to policy distribution. Note that in the illustrated system, a number of data processing machines are associated with a first location 20-*a* including first host 10-*a*-1, second host 10-*a*-2, a first security manager (SM) 11-*a*, a first Key Generation and Distribution Point (KGDP) 14-*a*, one or more internetworking devices 16-*a*, and a first Policy Enforcement Point (PEP) 20-*a*-1.

In addition, a first Security Policy Manager, (SPM) 30-1, which may or may not be physically located within the confines of location 20-*a*, is responsible for distributing policies 12 to and from location 20-*a* in a manner that will be described below.

Similarly, a second location 20-*b* has other data processing machines such as a first server 10-*b*-1, second server 10-*b*-2, an associated Security Manager (SM) 11-*b*, KGDP 14-*b*, and internetworking devices 16-*b*. Location 20-*b* may, for example, be a high availability web and/or storage server and thus has multiple PEPs 20-*b*-1 and 20-*b*-2. As with location 20-*a*, a second Security Policy Manager (SPM) 30-2 is associated with and responsible for policies distributed to and from location 20-*b*.

Locations 20-*a* and 20-*b* may be subnets, physical LAN segments or other network architectures. What is important is that the network locations 20-*a* and 20-*b* are logically separate from one another and from other locations 20. For example, a location 20 may be a single office of an enterprise that may have only several computers, or a location 20 may be a large building, complex or campus that has many, many different machines installed therein. For example, location 20-*a* may be in a west coast headquarters office in Los Angeles and location 20-*b* may be an east coast sales office in New York.

The policy managers 30, including first SPM 30-1 and second SPM 30-2 communicate with a central SPM (cSPM) 32 through network 24.

Policy Linkage

This module provides linkage of the Local and Remote Policy Definitions for a specific gateway. This may be automatic as in the complete policy definition currently used or it may be distributed across a network. The PEP could establish a secure tunnel with a Policy Distribution Point (PDP, not shown) with authorization performed in both directions. The PEP could either have the policy distribution done as the various units are configured and come on line or upon receiving a packet at the PEP for which no policy definition exists at the PEP. Policy distribution could be done in one of various ways.

For example, the local policy definition could be defined on the PEP along with a security group (SG) identification. The PEP could send the policy and SG to the PDP. The PDP could establish a secure tunnel with a SPM with authorization performed in both directions. The PDP would then send the policy and SG information to the SGC. The SGC would perform policy linkage with information from other SPM or PDP units. Policy linkage would be performed on matching SG identities. The corresponding remote portions of the policy would be sent to the PDP which would then forward the complete policy to all appropriate PEP units. There could either be a single SPM unit over the entire secure network, an SPM unit associated with various domains that communicate with each other and their domain's PDP units over secure tunnels, or a hierarchy of SGC units with domain SGCs communicating over secure tunnels to regional SGC units. Alternately, the PDP could communicate directly with peer PDP units that have been configured and could exchange local and remote policy information based on the security group.

The above approach could be taken with the local policy definition loaded on either the PDP or the SGC. Furthermore, the PDP could be configured with the complete policy definition. This could then be communicated to the PEP via a secure tunnel when required.

The reader will recall that "security policies" 12 can define traffic to be secured by source and destination, IP address, port and/or protocol. A security policy 12 also defines the type of security to be applied to a particular connection. The SPMs 30 define policies 12 by a function module known as local policy definition module. This module maintains information on IP addresses, subnet supports or protocols to be protected by a specific SPM 30. Each policy definition 12 can, in a preferred embodiment, be limited to a certain collection of subnets such as those at first location 20-*a* that are under control of a local administrator there.

The policy definitions 12 can be created by a user entering the pair of IP addresses via an administrative user command interface. However, policies 12 can also be defined using certain features of Microsoft Windows and similar operating systems that provide certain tools for specifying security policies for each node 10.

As the PEP's must carry out policies 12 in handling the traffic they see, the PEP's need to have access to policies in some manner, including not only policies for their respective local traffic, but also remote traffic. The present invention provides a scheme for distributing policy information not only to a local PEP 20-*a* that is local to a corresponding SPM 30-*a*, but also to distribute policy information to remote PEPs 20-*b*-1 and 20-*b*-2. The invention accomplishes this with limited or no involvement of the local security manager 11 in maintaining information about remote location policies, thus freeing each local security manager 11 from having to be updated with the same.

Figure 3:
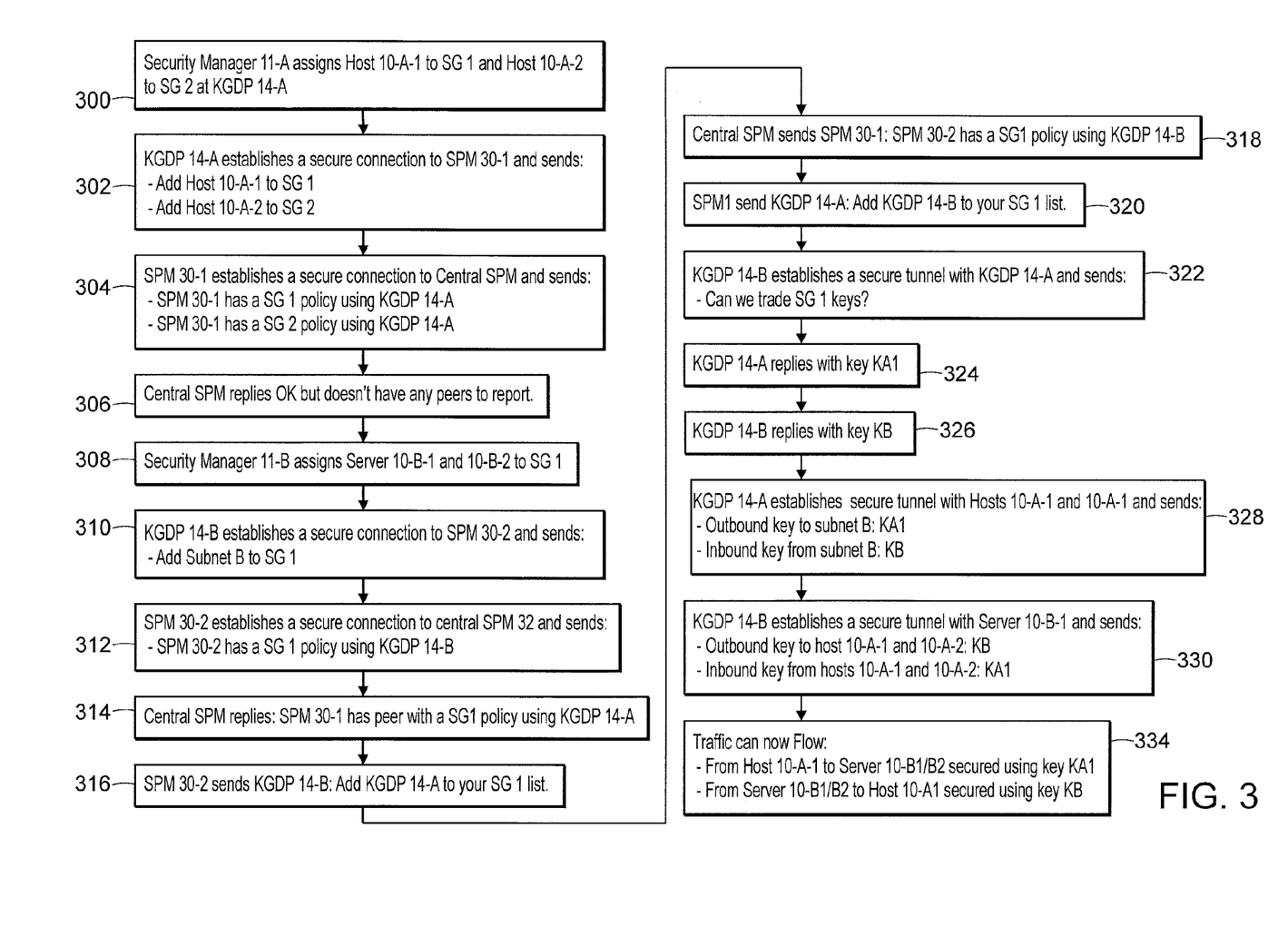
FIG. 3 is a flow chart of steps performed by the system of FIG. 1.

The specific process for doing so is shown in FIG. 3. In a first step 300, an SM 11-*a* assigns a first (local) policy 12. For example, policy 12 may specify that a host 10-*a*-1 is assigned to a first security group SG1. It may also define another policy 12-2 that specifies host 10-*a*-2 is assigned to a second security group SG2.

This assignment of hosts to security groups is then communicated from SM 11-*a* to its local KGDP 14-*a*; this communication may take place via a secure tunnel over a management interface, such as provided through local internetworking equipment 16-*a*.

In a next step 302, KGDP 14-*a* then eventually establishes a secure connection to a SPM 30-1. Over this secure connection (which may also be a secure tunnel) KGDP 14-*a* sends a request to add host 10-*a*-1 to security group 1 (SG1) and host 10-*a*-2 to security group 2 (SG2). At this point, SPM 30-1 enters the two security group entries in its database. However, these security group definitions will at this point only have host 10-*a*-1 and 10-*a*-2, respectively, associated with them and thus will be incomplete.

In a next step 302, KGDP 14-a then eventually establishes a secure connection to a SPM 30-1. Over this secure connection (which may also be a secure tunnel) KGDP 14-*a* sends a request to add host 10-*a*-1 to security group 1 (SG1) and host 10-*a*-2 to security group 2 (SG2). At this point, SPM 30-1 enters the two security group entries in its database. However, these security group definitions will at this point only have hosts 10-*a*-1 and 10-*a*-2, respectively, associated with them and thus will be incomplete.

In a next step 304, SPM 30-1 will eventually establish a secure connection to a central SPM 30-2. (Connections are attempted according to a schedule, so that the SPMs 30 and cSPM 32 remain updated). This connection is then used to distribute information about the new security groups (not necessarily the policies themselves), allowing central cSPM 32 to update its own database with a definition for a new security group. However the new security group definition will not necessarily include any specific details for any particular policies 12, and will not contain specific detailed information such as the nodes or addresses that participate in the security group(s). The security group database entry at cSPM 32 need only identify that the location SPM 30-1 has a policy called SG1 and, that policy SG1 can be or is controlled by KGDP 14-*a*. Therefore, KGPD 14-*a*, for example, can regulate, alter or update the policy SG1 as the definition of SG1 is changed, supplemented or subtracted. Similarly, an entry is made in cSPM 32 that SPM 30-1 has defined a security group policy SG2 using KGDP 14-*a*.

At this point at step 306, central SPM 32 will check its existing database, seeing that no peers have yet been associated with SPM 30-1 or KGDP 14-a, it will thus reply to KGDP 14-a that there are no peers to report at the present time.

After a period of time, in step 308 the security manager for the second location (SM 11-b) receives a security policy 12 input assigning server 10-b-1 and server 10-b-2 to security group SG1. This information is then passed to KGDP 14-b via a secure tunnel between SM 11-b and KGDP 14-b.

In step 310, KGDP 14-b establishes a secure connection to its local (the second) SPM 30-2 and with a request to add subnet B to SG1. Thus, it should be understood that participants in secure connection normally can be identified by particular end node identifiers, but also by their subnet identification as well.

In step 312, SPM 30-2 then establishes a secure connection to central SPM 32. SPM 30-2 will then send a message that SPM2 has a security group 1 policy using KGDP 14-b. Again, the details of that policy are not communicated to the central SPM—merely information that SPM 30-2 has a security policy associated with KGDP 14-b.

At this point, checking its database, central SPM 32 will note that there has already been a SG1 policy defined. Thus, in step 314 central SPM 32 will reply to SPM 30-2 that there is another SPM (namely the first SPM 30-1) that also has policy, and that SG1 policy is using KGDP 14-a. Note, however, that the details of the configuration of the policy (for example which end nodes are associated with it) need not be shared between SPM 30 and central SPM 32.

In step 316 SPM 30-2 may then contact its own local KGDP 14-b instructing it to add KGDP 14-a to its SG1 list. The central SPM in step 318 will similarly send a message to SPM 1 30-1 informing it that SPM 2 has a security group policy in KGDP 14-b.

In step 320, upon receipt of such a message, SPM 30-1 will check its database noting that it has a complete security group policy for SG1. Thus it will inform KGDP A to add KGDP 14-b to its own SG1 list.

Figure 4:
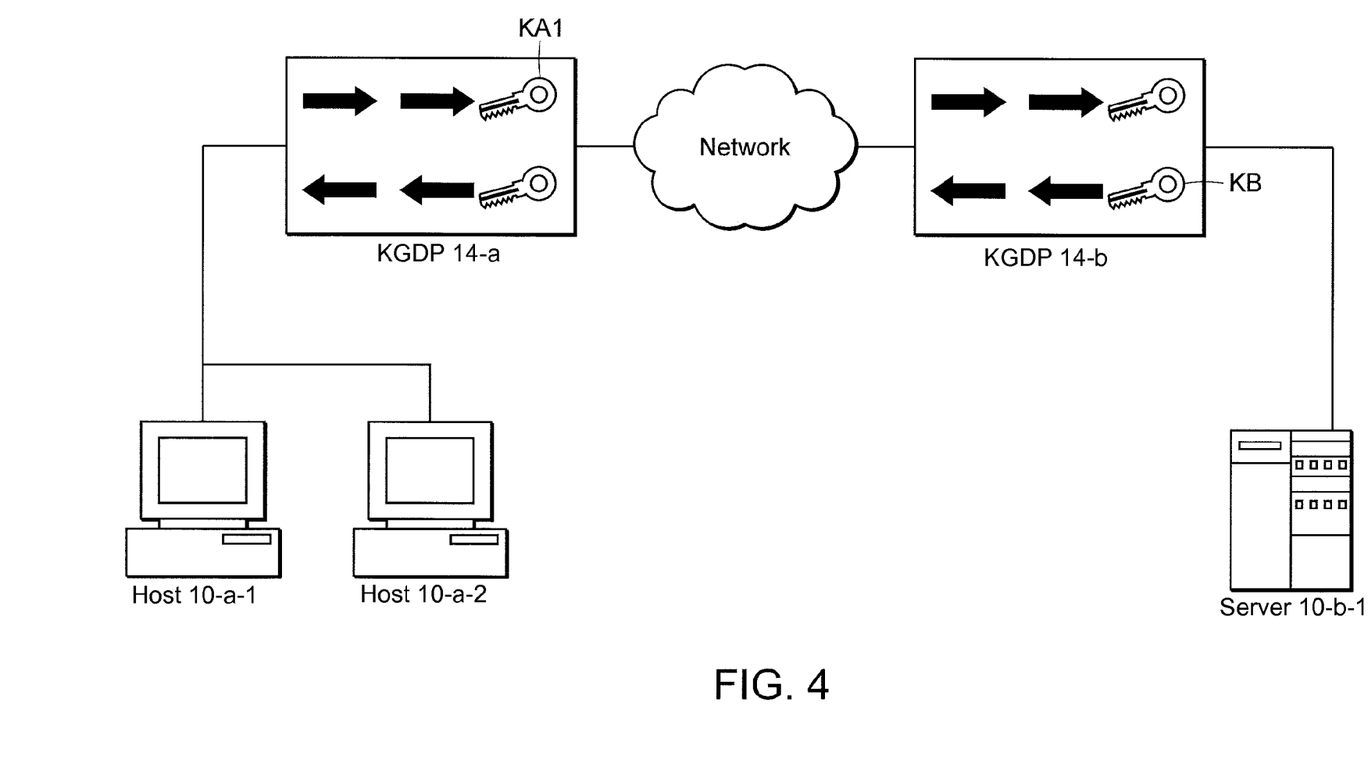
FIG. 4 is a system level diagram illustrating key exchange between two KGDPs.

Again, after the expiration of some time, as shown in FIG. 4, in step 322 KGDP 14-b may establish a secure tunnel with KGDP 14-a and request if it can trade keys for SG1. If the answer is affirmative, then KGDP 14-a in step 324 will reply with key KA1 that is associated with host 10-a-1. In step 326, KGDP 14-b will reply with its keys KB associated with outbound transmissions for subnet B.

The key exchange between KGDPs still requires distribution of keys to the respective PEPs 20 that will be handling the traffic. This can be done in a number of different ways as described in a copending patent application entitled SECURING NETWORK TRAFFIC USING DISTRIBUTED KEY GENERATION AND DISSEMINATION OVER SECURE TUNNELS, U.S. Provisional Patent Application No. 60/756,765, filed Jan. 6, 2006, assigned to CipherOptics, Inc., and which is hereby incorporated by reference.

However, in one preferred embodiment as shown in step 328, KGDP 14-a establishes a secure connection with its local nodes 10-a-1 and sends its keys to be used. Namely to use key KA1 as an outbound key when communicating with subnet B, and to use key KB when communicating as an inbound key with messages received from subnet B.

KGDP 14-b in step 330 similarly establishes a secure tunnel with its local server 10-b-1, telling it to use key KB as an outbound key when communicating with host 10-a-1.

In step 334, traffic can now flow in an encrypted fashion from host 10-a-1 to server 10-b-1 and/or server 10-b-2, being secured using key KA 1 as well as from server 10-b-1 or 10-b-2 to host 10-a-1 secured using key KB.

Figure 5:
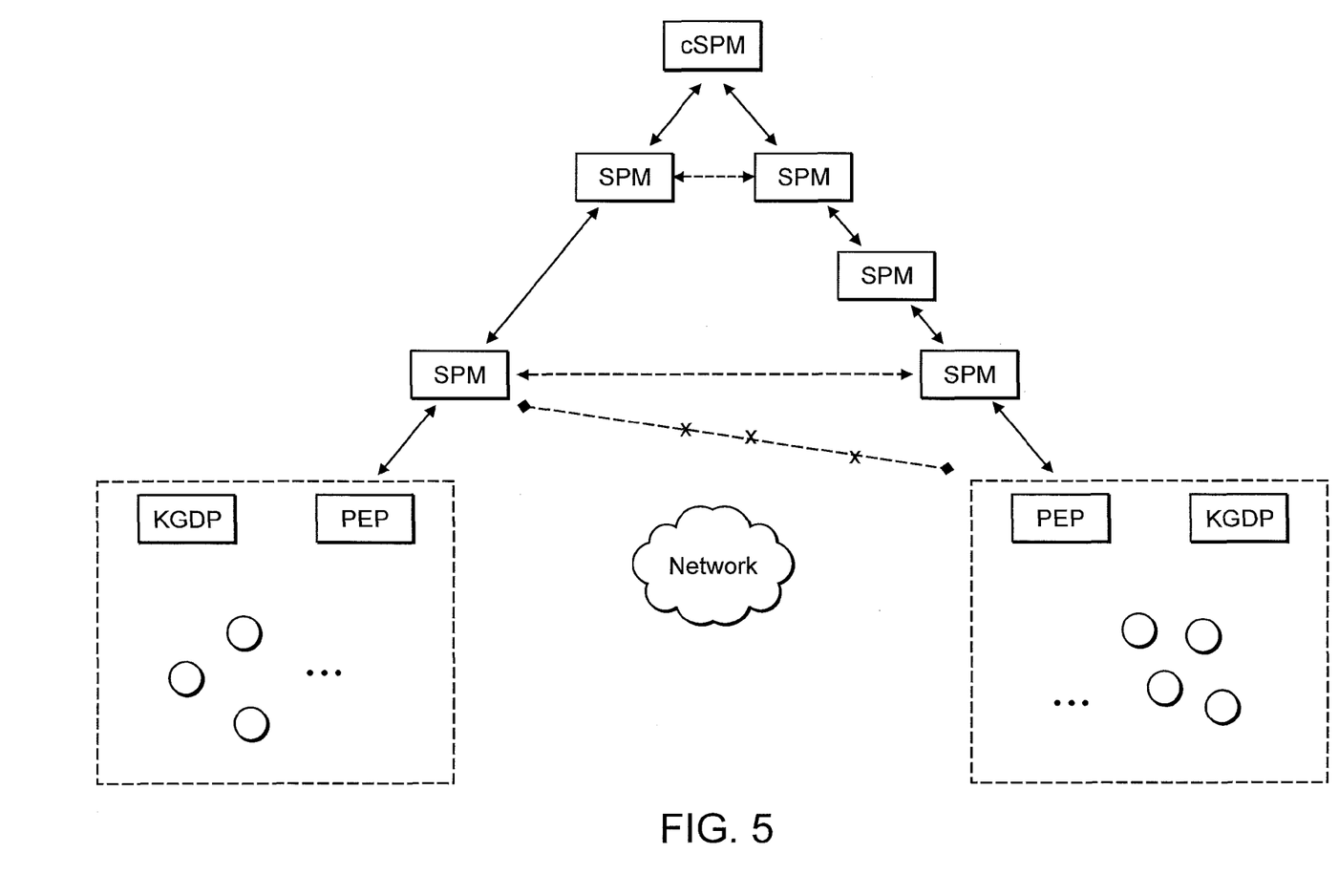
FIG. 5 illustrates a hierarchy of SPMs and cSPMs.

It should be understood now that the SPMs 30 and central SPM 32 form a hierarchy. As shown in FIG. 5, instead of there being a single central SPM 32 there may also be a hierarchy thereof which will in turn communicate requests up and down the chain. The hierarchy of SPMs may also communicate with their neighbor in the hierarchy, such that a change in policies and identifiers for machines to which requests to establish the policies should be directed.

The invention provides several advantages over prior art policy distribution schemes. It avoids polling that would otherwise be necessary for KGDPs 14 to themselves discover peers in the network and/or PEPs 20. It is also more secure, in that not every device needs to know everything about security. Thus, SPM devices are essentially associated with distributing policy information in KGDPs 14 are associated with their local subnets, but not necessarily associated with actually applying keys or encrypting or decrypting traffic.

SPMs 30 and 32 also need not be aware of local security policies—only how to identify where such definitions can be found by peers in the hierarchy.

It should be understood that the association between security groups and hosts could take place in ways other than just the SM sending the information to the KGDP. In particular, the SM might send the association to any SPM in the hierarchy and the KGDP could make an inquiry via the SPM. Alternately, the KGDP and/or SPM could access this data from an independent database interface, such as Active Directory, to perform authentication and obtain group association.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for securing Internet Protocol (IP) traffic, the system comprising:
    a first security module, within a first local communication network, configured to apply a security policy to a network connection, the security policy including at least a definition of a security group, the security group includes at least a subset of a group of end nodes located at the first local communication network;
    a first distribution point, located at the first local communication network, configured to determine the security policy and to forward the security policy to a first managing module;
    the first managing module being associated with the first communication network and configured to
        a) upon receiving the security policy from the first distribution point, record an association between the security group and an identifier for the first distribution point; and
        b) send a message to a central managing module indicating that the first managing module has stored the definition of the security group associated with the first distribution point.

2. The system of claim 1, wherein the communication network includes an Ethernet, an asynchronous transfer mode (ATM), one or more inter-networking or a wireless communication network.

3. The system of claim 1, wherein the first group of end nodes include any of a personal computer, a workstation, a personal digital assistant, a digital mobile telephone, a wireless network, a server, a video set top boxes and a data processor.

4. The system of claim 1, wherein the first security module is a Policy Enforcement Point.

5. The system of claim 1, wherein the first distribution point is further configured to forward an updated version of the security policy to the first managing module according to a schedule.

6. The system of claim 1, wherein the central managing module is configured to generate a security group database entry based on the message sent from the first managing module.

7. The system of claim 6, wherein the security group database entry indicates that:
   a) the security policy is located at the first managing module; and
   b) the security policy is controlled by the first distribution point.

8. The system of claim 6, wherein the first managing module and the central managing module are in a hierarchy, the hierarchy comprising at least a second managing module, wherein:
   the second managing module is associated with a second local communication network and configured to send a message to the central managing module that indicates the second managing module has additional information associated with the definition of the security group.

9. The system of claim 8, wherein the central managing module is further configured to send a message to the first managing module that the second managing module has the additional information.

10. The system of claim 9 further comprising a secure association formed between the first distribution point and the a second distribution point for exchanging keys for encryption and decryption of a data packet.

11. The system of claim 10, wherein the first distribution point is further configured to distribute the exchanged keys to additional one or more security modules in the first local communications network.

12. A method for securing message traffic in a data network by distributing security policies comprising the steps of:
   at a first distributing point located at a first local communication network,
      determining a security policy to be applied to a network connection, the security policy including at least a definition of a security group and a network device that is assigned to the security group, the security group includes at least a subset of a group of end nodes located at the first local communication network;
      forwarding the security policy from the first distribution point to a first managing module associated with the first local communication network,
   at the first managing module,
      receiving the security policy from the first distribution point;
      recording a first association between the first security policy and an identifier for the first distribution point;
      sending a message to a central managing module indicating that the first managing module has stored the definition of the security group associated with the first distribution point, and
   at the central managing module,
      receiving the first message; and
      generating a security group database entry based on the first message.

13. The method of claim 12 further comprising the step of:
   at the central managing module,
      receiving additional messages associated with definitions of additional security groups from two or more additional managing modules associated with, respectively, two or more other local communication networks; and
      generating additional security group databases entry based on the additional information.

14. The method of claim 13 further comprising:
   at a second managing module associated with a second local communication network that includes a second distribution point,
      recording a second association between the security policy and an identifier for a the second distribution point.

15. The method of claim 14 further comprising:
   at the central managing module,
      receiving a message from the second managing module indicating that the second managing module has additional information associated with the definition of the security group; and
      updating the first security group database.

16. The method of claim 15 further comprising:
   at the central managing module;
      sending a message to the first managing module indicating that the second managing module has the additional information.

17. The method of claim 16, wherein the message sent to the first managing module identifies the second distribution point, the method further comprising:
   at the first managing module,
      sending a message to the first distribution point to add the second distributing point to the security group.

18. The method of claim 17 further comprising a step of exchanging keys between the first and second distribution points via one or more secure tunnels.

19. The method of claim 18 further comprising:
   at the first location that includes one or more additional security components,
      distributing the exchanged keys to one or more security components in the first local communication network.

20. A non-transitory computer readable medium having computer readable program codes embodied therein for securing message traffic in a data network by distributing security policies, the computer readable medium program codes performing functions comprising:
   a routine for determining a security policy to be applied to a network connection at a first distributing point located at a first local communication network, the security policy including at least a definition of a security group and a network device that is assigned to the security group, the security group includes at least a subset of a group of end nodes located at the first local communication network;
   a routine for forwarding the security policy from the first distribution point to a first managing module associated with the first local communication network;
   a routine for receiving at the first managing module the security policy from the first distribution point;
   a routine for recording at the first managing module a first association between the security group and an identifier for the first distribution point;
   a routine for sending a message from the first managing module to a central managing module indicating that the first managing module has stored the definition of the security group associated with the first distribution point;

a routine for receiving the first message at the central managing module; and a routine for generating a security group database entry based on the first message at the central managing module.

* * * * *